United States Patent
Son

(10) Patent No.: US 12,531,128 B2
(45) Date of Patent: Jan. 20, 2026

(54) MEMORY DEVICE, MEMORY SYSTEM HAVING THE SAME AND OPERATING METHOD THEREOF

(71) Applicant: SAMSUNG ELECTRONICS CO., LTD., Suwon-si (KR)

(72) Inventor: Jongpil Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 258 days.

(21) Appl. No.: 18/364,303

(22) Filed: Aug. 2, 2023

(65) Prior Publication Data

US 2024/0212776 A1      Jun. 27, 2024

(30) Foreign Application Priority Data

Dec. 23, 2022   (KR) .................. 10-2022-0183227

(51) Int. Cl.
| | |
|---|---|
| G11C 29/14 | (2006.01) |
| G11C 29/12 | (2006.01) |
| G11C 29/42 | (2006.01) |
| G11C 29/46 | (2006.01) |

(52) U.S. Cl.
CPC .......... *G11C 29/1201* (2013.01); *G11C 29/14* (2013.01); *G11C 29/42* (2013.01); *G11C 29/46* (2013.01)

(58) Field of Classification Search
CPC ..... G11C 29/1201; G11C 29/14; G11C 29/42; G11C 29/46; G11C 29/12; G11C 29/44; G11C 5/025; G11C 29/52; G11C 11/4096; G11C 29/70; G11C 5/04; G11C 11/4082; G11C 11/4093
See application file for complete search history.

(56) References Cited

U.S. PATENT DOCUMENTS

| | | | |
|---|---|---|---|
| 7,590,014 B2 | 9/2009 | Kim | |
| 8,738,976 B2 | 5/2014 | Nakano et al. | |
| 10,048,877 B2 | 8/2018 | Miller et al. | |
| 10,108,684 B2 | 10/2018 | Abraham et al. | |
| 2008/0270717 A1 | 10/2008 | Shaw et al. | |
| 2014/0241024 A1* | 8/2014 | Kim ...................... | G11C 5/063 |
| | | | 365/63 |
| 2019/0096459 A1 | 3/2019 | Son | |
| 2021/0104291 A1 | 4/2021 | Kim et al. | |
| 2021/0225827 A1* | 7/2021 | Lanka ................. | H01L 23/5385 |
| 2023/0298631 A1* | 9/2023 | Park ...................... | H01L 25/18 |

FOREIGN PATENT DOCUMENTS

KR    10-2007-0074322    7/2007

OTHER PUBLICATIONS

"TSV Trends and Development Prospects", Jul. 2012, Journal of the Electronic Engineering Society, vol. 39, No. 7_Jongpil Son.

* cited by examiner

*Primary Examiner* — Mohammed A Bashar

(74) *Attorney, Agent, or Firm* — Morgan, Lewis & Bockius LLP

(57) ABSTRACT

A memory system includes a plurality of stacked memory dies. Each of the plurality of memory dies includes a first memory device connected to a first channel and a second memory device connected to a second channel. In a mirroring mode, when the first memory device performs a first write operation on write data, the second memory device performs a second write operation on the write data.

20 Claims, 9 Drawing Sheets

MEMORY DEVICE, MEMORY SYSTEM HAVING THE SAME AND OPERATING METHOD THEREOF

CROSS-REFERENCE TO RELATED APPLICATION

This U.S. patent application claims priority under 35 U.S.C. 119(a) to Korean Patent Application No. 10-2022-0183227 filed on Dec. 23, 2022, in the Korean Intellectual Property Office, the disclosure of which is incorporated by reference in its entirety herein.

The present disclosure relates to a memory device, a memory system having the same and an operating method thereof.

DISCUSSION OF RELATED ART

A dynamic random access memory (DRAM) is a type of random access semiconductor memory that stores data in a memory cell array. The memory cell array includes a plurality of banks. A memory system may include the DRAM and a memory controller. The memory cell array may receive a recording command and corresponding data from the memory controller, and store data in the plurality of banks according to a command decoding result.

The same data may be stored in several of the banks to provide redundancy to an increase data integrity. However, performance of the memory system may decrease since less space of the memory cell array is available for storing new data. Thus, there is a need for a memory system that can more efficiently perform a data recording operation.

SUMMARY

An aspect of the present disclosure provides a memory device supporting a mirroring mode, a memory system having the same, and an operating method thereof.

According to an aspect of the present disclosure, a memory system includes: a package substrate, an interposer, a logic die, a memory device, and a control chip. The interposer is disposed on the package substrate. The logic die is disposed on the interposer. The memory device is disposed on the logic die. The control chip configured to control the memory device. The memory device includes a plurality of stacked memory dies. Each of the plurality of memory dies includes a first memory device connected to a first channel and a second memory device connected to a second channel. In a mirroring mode, the first memory device performs a first write operation on write data, and the second memory device performs a second write operation on the write data.

According to an aspect of the present disclosure, an operating method of a memory device connected to a control chip through a plurality of channels includes: the memory device setting an operation mode of the memory device internally to a mirroring mode; sharing a command, an address, and write data of a first channel among the plurality of channels with a second channel among the plurality of channels, in the mirroring mode; and the memory device performing a write operation using the command, the address, and the write data shared by the second channel.

According to an aspect of the present disclosure, provided is a memory device having a plurality of memory dies stacked on a package substrate. Each of the plurality of memory dies include: a first memory device and a second memory device. The first memory device includes include a first row address buffer, a first column address buffer, and a first data buffer, connected to the first channel. The second memory device includes a second row address buffer, a second column address buffer, and a second data buffer, connected to a second channel. The second memory device includes first through fourth multiplexers. The first multiplexer is configured to output one of an output signal of the first row address buffer and an output signal of the second row address buffer in response to a mirroring mode signal. The second multiplexer is configured to output one of an output signal of a first command decoder and an output signal of the a command decoder in response to the mirroring mode signal. The third multiplexer is configured to output one of an output signal of a column address buffer and an output signal of a column address buffer of the second memory device in response to the mirroring mode signal. The fourth multiplexer is configured to output one of an output signal of the first data buffer and an output signal of the second data buffer in response to the mirroring mode signal.

A memory device, a memory system having the same and an operating method thereof according to example embodiments of the present disclosure may support a mirroring mode, thereby maintaining the integrity of data by using data of undamaged channels even if data of some of the channels becomes damaged.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, the present disclosure will be described in a clear and detailed manner such that those skilled in the art may implement the present disclosure using the drawings.

Server-grade CPUs (Central Processing Units (CPUs) may provide data mirroring functionality to maintain data integrity. This data mirroring function involves writing identical data to multiple memory channels in the CPU so that if data in some channels becomes corrupted, the integrity of the data can be maintained using the data from uncorrupted channels. A memory device, a memory system including the memory device, and a method of operating the memory device according to embodiments of the present invention can increase Reliability, Availability, and Serviceability (RAS) performance by efficiently implementing data mirroring functionality, which shares commands, addresses, and data of other channels in a mirroring mode (or RAID1).

Figure 1:
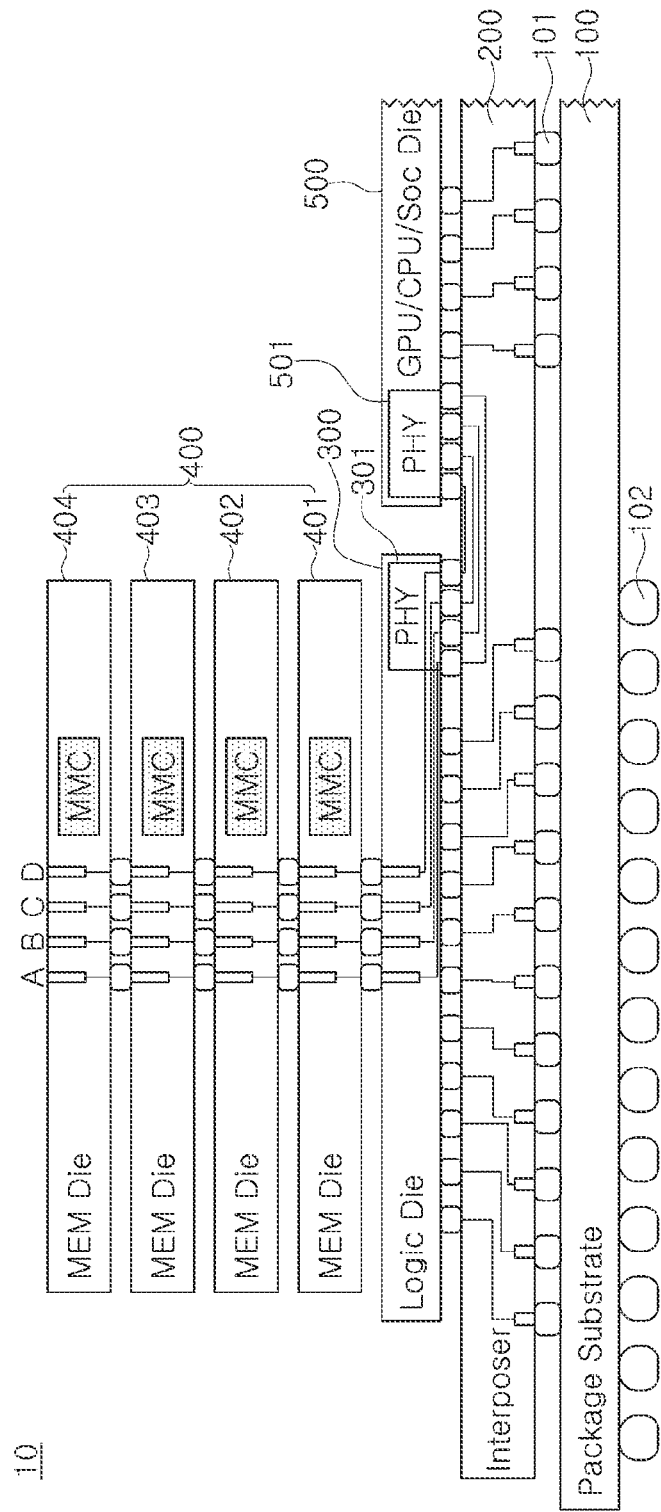
FIG. 1 is a diagram illustrating a memory system 10 according to an example embodiment of the present disclosure.

FIG. 1 is a diagram illustrating a memory system 10 according to an example embodiment of the present disclosure. Referring to FIG. 1, the memory system 10 includes a package substrate 100, an interposer 200, a logic die 300, a memory device 400, and a control chip 500. The interposer 200 may be an electrical interface.

Bumps 101 may be attached to an upper portion of the package substrate 100, and a solder ball 102 may be attached to a lower portion of the package substrate 100. For example, the bumps 101 may be flip-chip bumps. For example, the solder ball 102 may be provided in a plurality as balls of solder.

The interposer 200 may be stacked on the package substrate 100 through the bumps 101. The memory system 10 may transmit or receive signals to or from other external packages or semiconductor devices through the solder ball 102. For example, the package substrate 100 may be a printed circuit board (PCB). Furthermore, the interposer 200 may connect the memory device 400 and the control chip 500. The interposer 200 may provide a connection between a physical layer 301 of the memory device 400 and a physical layer 501 of the control chip 500. The connection may include physical paths formed using conductive materials. Accordingly, the memory device 400 and the control chip 500 may be stacked on the interposer 200 to transmit to receive input/output signals to or from each other.

The logic die 300 may include a physical layer 301 and a direct access region. The physical layer 301 may be electrically connected to the physical layer 501 of the control chip 500 through the interposer 200. The memory device 400 may receive input/output signals from the control chip 500 through the physical layer 301 or transmit the input/output signals to the control chip 500. The physical layer 301 may include an interface circuit of the logic die 300. Furthermore, the direct access region may provide an access path through which the memory device 400 may be tested without passing through the control chip 500. For example, a test signal output from an external test device may pass through the direct access region to the memory device 400 without passing though the control chip 500. The direct access region may include a conductive means (e.g., a port/pin) that may directly communicate with the external test device. The test signal received through the direct access region may be transmitted to memory dies 401, 402, 403, and 404 through through-silicon vias (TSVs). While FIG. 1 illustrates four memory dies 401-404, the disclosure is not limited thereto. For example, memory system 10 may include fewer or more than four memory dies.

Further, the logic die 300 and the memory dies 401 to 404 may be electrically connected to each other through the TSVs and the bumps. For example, the logic die 300 may receive the input/output signals provided to each channel through bumps allocated for each channel from the control chip 500 or transmit the input/output signals to the control chip 500 through the bumps. For example, the bumps may be microbumps. Furthermore, the logic die 300 may include an error correction circuit for correcting errors in each piece of data of a plurality of channels. For example, the error correction circuit may correct the errors using an error correction code (ECC).

The memory device 400 may include a plurality of memory dies 401 to 404 stacked on an upper portion of the logic die 300. Each of the memory dies 401 to 404 may include memory cells for storing data. Here, each of the memory cells may be implemented as a volatile memory cell or a nonvolatile memory cell. The memory dies 401 to 404, the data read from the memory dies 401 to 404 may be transmitted to a test device through the TSVs and the direct access region to test the memory dies 401 to 404. Accordingly, a direct access test for the memory dies 401 to 404 may be performed.

In an embodiment, the memory device 400 is implemented to share channels A, B, C, and D to support a mirroring function. Here, the mirroring function may support a redundant array for independent disks 1 (RAID1). For example, each of the memory dies 401 to 404 may include a mirroring mode circuit MMC for supporting a mirroring mode. In an example embodiment, the mirroring mode circuit MMC is implemented to share a write command and write data in at least two channels in the mirroring mode. In an example embodiment, the mirroring mode is entered by setting a mode register set (MRS) or applying a command. In another example embodiment, the mirroring mode is set by the control chip 500.

The control chip 500 may be implemented to control the memory device 400. The control chip 500 may execute applications supported by the memory system 10 using the memory device 400. For example, the control chip 500 may execute specialized arithmetic operations by including at least one of a central processing unit (CPU), an application processor (AP), a graphic processing unit (GPU), a neural processing unit (NPU), a tensor processing unit (TPU), a vision processing unit (VPU), an image signal processor (ISP), and a digital signal processor (DSP). For example, the CPU, AP, GPU, NPU, TPU, VPU, ISP, or the DSP may execute the specialized arithmetic operations.

Further, the control chip 500 includes the physical layer 501. The physical layer 501 may include an interface circuit for transmitting or receiving the input/output signals to or from the physical layer 301 of the memory device 400. The control chip 500 may provide various input/output signals to the physical layer 301 through the physical layer 501. The signals provided to the physical layer 301 may be transferred to the memory dies 401 to 404 through the interface circuit and TSVs of the physical layer 301. In an example embodiment, the control chip 500 perform training for each group of the bumps for transmitting the input/output signals to the physical layer 301. According to the training, output timings of data signals output from the physical layer 501 through one bump group of the control chip 500 may be identical to each other. Lengths of signal lines of the interposer 200 connecting one bump group of the control chip 500 and a corresponding bump group of the memory device 400 may be identical to each other to enable the output data signals to reach the physical layer 301 at the same timing.

A general memory system may be difficult to repair when a progressive defect occurs in a TSV or a microbump in a memory device.

On the other hand, the memory system 10 of the present disclosure may write the same data to multiple channels A, B, C, and D in the mirroring mode, and maintain the data integrity by using undamaged channels when data on some channels becomes damaged. That is, the memory system 10 of the present disclosure may efficiently configure the data mirroring function provided by the control chip 500 in the memory device 400, thereby increasing the RAS performance of the system.

Figure 2:
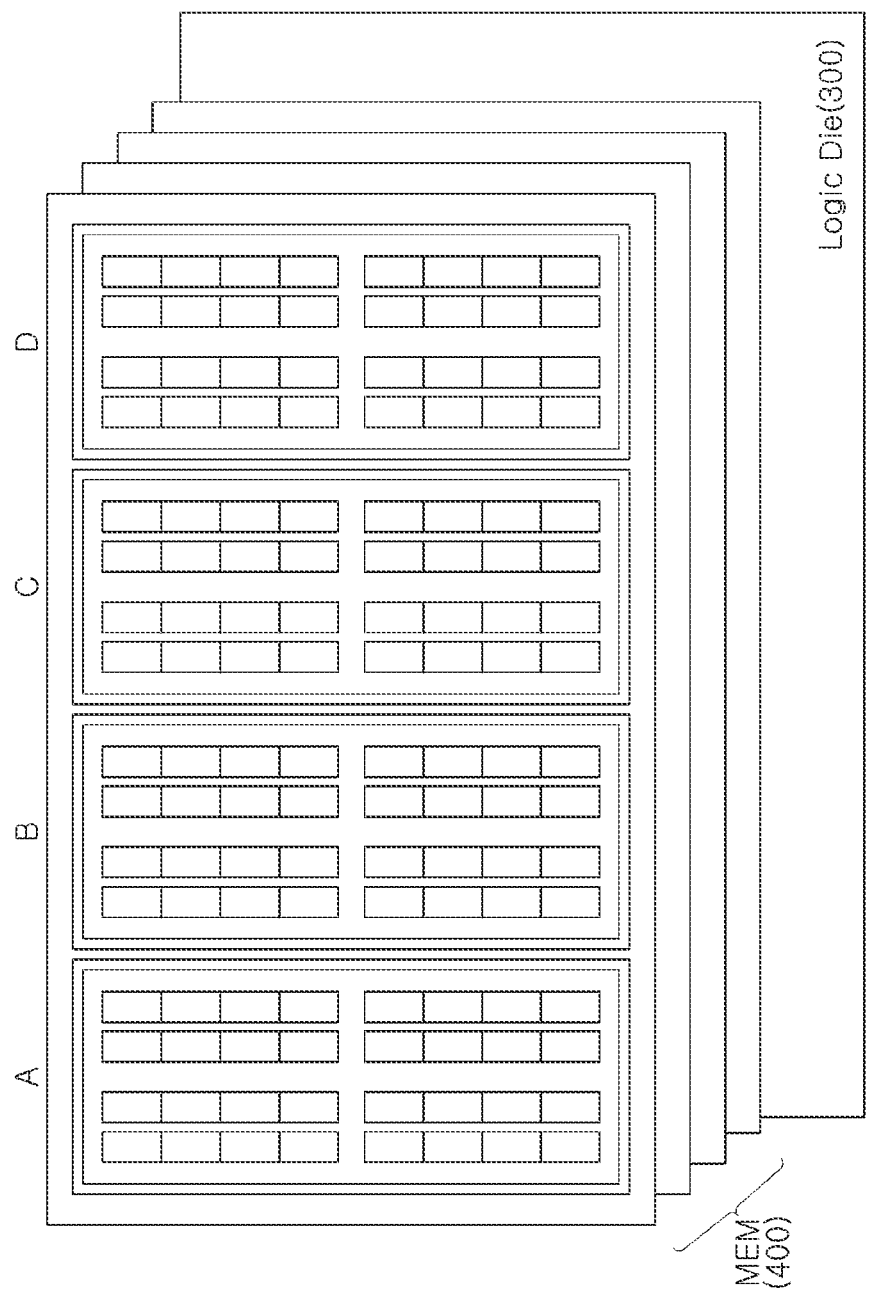
FIG. 2 is a diagram illustrating a memory device 400 in which four channels A, B, C, and D are implemented in a memory die according to an example embodiment of the present disclosure.

FIG. 2 is a diagram illustrating the memory device 400 in which four channels A, B, C, and D are implemented in the memory die according to an example embodiment of the present disclosure.

Referring to FIG. 2, each memory die of the memory device 400 may include the four channels A, B, C, and D. Even if the first channel A becomes defective, the memory device 400 may be repaired via the second channel B. For example, the memory device 400 may operate using the second channel B if the first channel A becomes defective. The memory device 400 according to an example embodiment of the present disclosure may reduce current usage using an RA/CA/DQ buffer only as the first channel A until a defect occurs. In an example embodiment, such a data mirroring function may be selectively executed only in some important data regions such as an operating system (OS) region.

Figure 3:
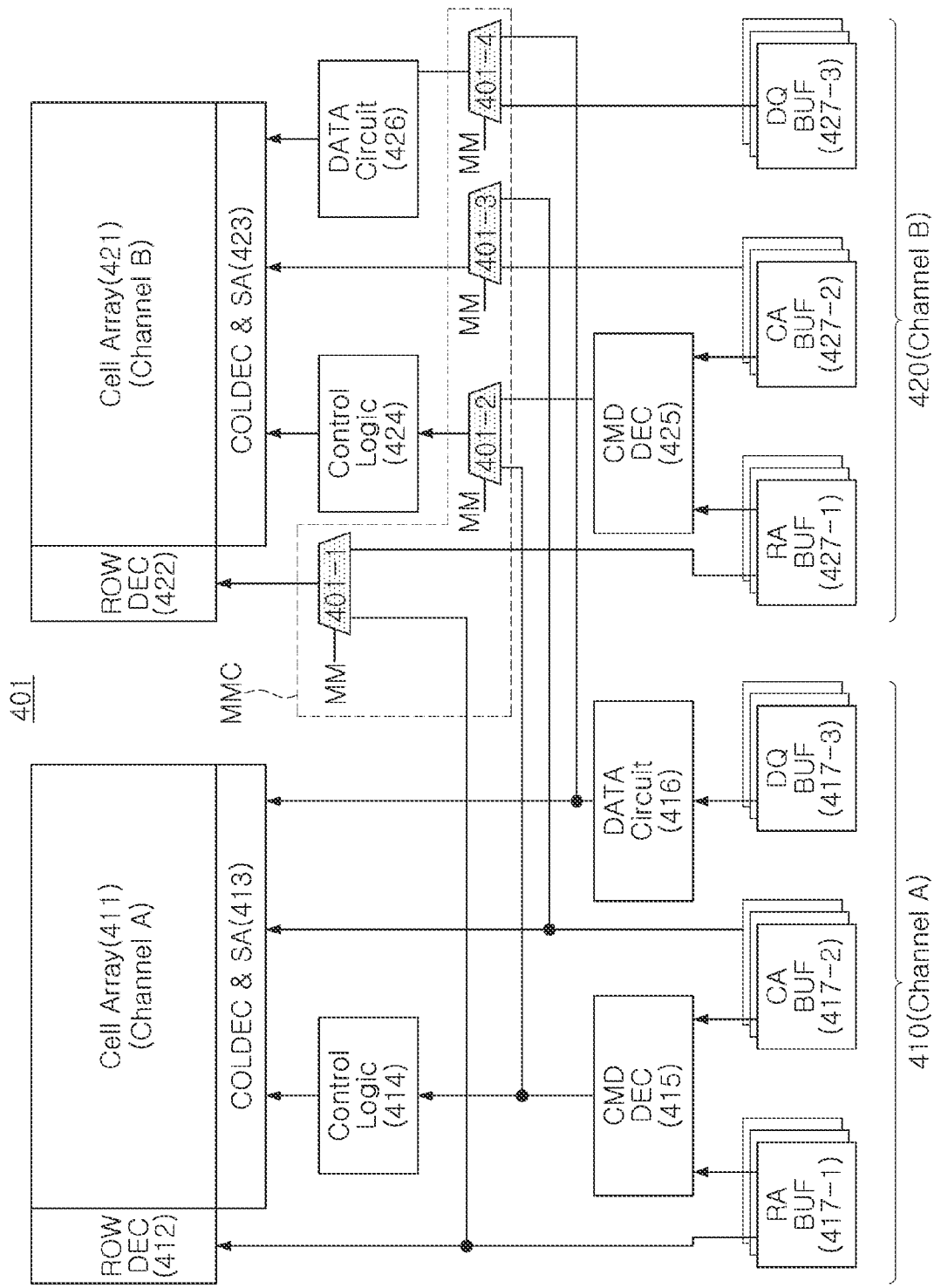
FIG. 3 is a diagram illustrating a memory die 401 according to an example embodiment of the present disclosure.

FIG. 3 is a diagram illustrating a memory die 401 according to an example embodiment of the present disclosure. Referring to FIG. 3, the memory die 401 includes a first memory device 410 connected to the first channel A, a second memory device 420 connected to the second channel B, and multiplexers 401-1, 401-2, 401-3, and 401-4.

The first memory device 410 may include a cell array 411, a row decoder 412 (e.g., a decoder circuit), a column decoder and a sense amplification circuit 413, a control logic 414 (e.g., a logic circuit), a command decoder 415 (e.g., a decoder circuit), a data circuit 416, a row address buffer 417-1, a column address buffer 417-2, and a data buffer 417-3.

The cell array 411 may include a plurality of banks having a plurality of memory cells arranged between word lines and bit lines. Here, each of the memory cells may be a volatile memory cell or a nonvolatile memory cell.

The row decoder 412 may be implemented to select any one of a plurality of word lines in response to a row address RA. That is, the row decoder 120 may decode the row address RA output from the address buffer 150 and select a word line corresponding to the row address RA in a data write/read mode. Furthermore, the row decoder 412 may be implemented to perform a refresh operation on a corresponding word line based on a row address generated from a refresh control circuit.

The column decoder and the sense amplification circuit 413 may be implemented to select the bit line connected to the memory cell in response to a column address CA. The column decoder may decode the column address CA and select the bit line corresponding to the column address CA in a data write mode or a data read mode. The sense amplification circuit 413 may be implemented to sense and amplify data of the selected memory cell. For example, the sense amplification circuit 413 may sense data by sensing and amplifying the voltage of the bit line selected by the column decoder. When the memory bank includes a plurality of sub-arrays, the sense amplification circuit 413 may include a plurality of sense amplifiers.

The control logic 414 may be implemented to control an overall operation of the memory chip 410. The control logic 414 may include a refresh control circuit and a mode register circuit. The refresh control circuit may receive the decoded refresh signal from the command decoder 415 and output an internal row address to the row decoder 412 to refresh one word line of the memory cell array 411. The mode register circuit may set an internal mode register in response to a mode register set (MRS)/extended mode register set (EMRS) command for specifying an operation mode of the memory device 410. Furthermore, the mode register circuit may output an activation signal to a data circuit 416 in order to control an operation of the data circuit 416 according to the write/read operation.

The command decoder 415 may be implemented to receive a command CMD from an external device (i.e., the control chip 500, see FIG. 1) through the first channel A and internally generate command signals (e.g., an active signal, a read signal, a write signal, a refresh signal, etc.) that decode the received command CMD.

The data circuit 416 may be implemented to receive data from an external device through DQ pins during a write operation and transmit the received data to the sense amplification circuit 413. Furthermore, the data circuit 416 may receive data sensed in the sense amplification circuit 413 from memory cells corresponding to an address ADD during a read operation and output the received data to an external device through the DQ pins.

Furthermore, the data circuit 416 may be implemented to change a data output path according to a read retry command of the external device (i.e., the control chip 500). For example, the data circuit 416 may select a first read output path (i.e., a normal data output path) during a normal read operation and a second read output path (i.e., a mirroring data output path) according to the read retry command during a read operation. A switching circuit for selecting the first read output path and the second read output path may be provided.

The row address buffer 417-1 may be implemented to store the row address RA among addresses received from the first channel A. The column address buffer 417-2 may be implemented to store the column address CA among addresses received from the second channel B. The data buffer 417-3 may be implemented to store data received from the first channel A during the write operation or to store data received from the data circuit 416 during the read operation.

The second memory device 420 may include a cell array 421, a row decoder 422 (e.g., a decoder circuit), a column decoder and a sense amplification circuit 423, a control logic 424 (e.g., a logic circuit), a command decoder 425 (e.g., a decoder circuit), a data circuit 426, a row address buffer 427-1, a column address buffer 427-2, and a data buffer 427-3. The configuration of the second memory device 420 may be implemented in the same or similar manner as the configuration of the first memory device 410.

In an embodiment, each of the multiplexers 401-1 to 401-4 is implemented to select a shared input line (e.g., a line corresponding to the channel A) as an output line among input lines in response to a mirroring mode signal MM. In an example embodiment, the mirroring mode signal MM may be output or generated from mode register set (MRS) information. In an example embodiment, the first channel A and the second channel B are connected to the external control chip 500 (see FIG. 1) through the through silicon via (TSV). In an example embodiment, when an error rate of the first channel A exceeds a threshold, the mirroring mode signal MM is internally generated without management of the control chip 500. In an example embodiment, each of the plurality of memory dies may further include a mirroring mode circuit MMC for supporting the mirroring mode.

In response to the mirroring mode signal MM, the first multiplexer 401-1 may select one of an output signal of the first row address buffer 417-1 and an output signal of the second row address buffer 427-1 as a row address and output the selected output signal to the row decoder 422. For example, the first multiplexer 401-1 may output a row address from the first row address buffer 417-1 when the mirroring mode signal MM has one logic level and output a row address from the second row address buffer 427-1 when the mirroring mode signal MM has another logic level.

In response to the mirroring mode signal MM, the second multiplexer 401-2 may select one of an output signal of the first command decoder 415 and an output signal of the second command decoder 425 and output the selected output signal to the control logic 424. For example, the second multiplexer 401-2 may provide an output signal from the first command decoder 415 when the mirroring mode signal MM has one logic level and provide the output signal from the second command decoder 425 when the mirroring mode signal MM has another logic level.

In response to the mirroring mode signal MM, the third multiplexer 401-3 may select one of an output signal of the first column address buffer 417-2 and an output signal of the second column address buffer 427-2 as a column address and output the selected output signal to the column decoder. For example, the third multiplexer 401-3 may provide an output signal from the first column address buffer 417-2 when the mirroring mode signal MM has one logic level and provide the output signal from the second column address buffer 427-2 when the mirroring mode signal MM has another logic level.

In response to the mirroring mode signal MM, the fourth multiplexer 401-4 may select one of an output signal of the first data buffer 417-3 and an output signal of the second data buffer 427-3 as data and output the selected output signal to the data circuit 426. For example, the fourth multiplexer 401-4 may provide an output signal from the first data buffer 417-3 when the mirroring mode signal MM has one logic level and provide the output signal from the second data buffer 427-3 when the mirroring mode signal MM has another logic level.

Meanwhile, the multiplexers 401-1 to 401-4 illustrated in FIG. 3 are implemented to write the same data as data written in the memory device 410 connected to the first channel A in the mirroring mode, in the memory device 420 connected to the second channel B, but vice versa. For example, the same data as data written in the memory device 420 connected to the second channel B in the mirroring mode is implemented to be written in the memory device 410 connected to the first channel A. For example, data stored in memory device 410 using the first channel A may be redundantly stored in memory device 420 using the second channel B.

Meanwhile, when the operation mode is not a mirroring mode (i.e., when the operation mode is a normal mode), the first memory device 410 and the second memory device 420 may independently perform the write operation or the read operation through corresponding channels A and B. For example, when the operation mode is not the mirroring mode, data may be stored in the first memory device 410 using the first channel A without causing this data to be redundantly stored in the second memory device 420 using the second channel B.

Each of the first memory device 410 and the second memory device 420 may include an error correction circuit.

Figure 4A:
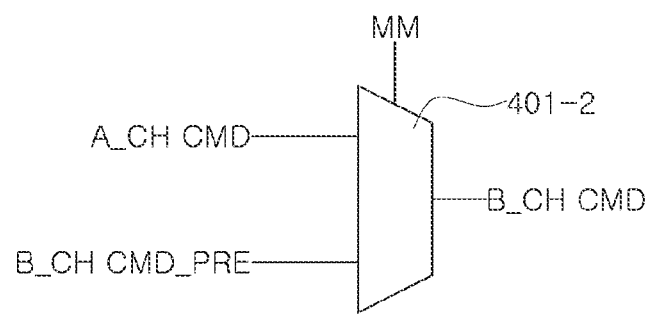
FIGS. 4A and 4B are views illustrating a mirroring mode circuit according to some embodiment of the present disclosure.
Figure 4B:
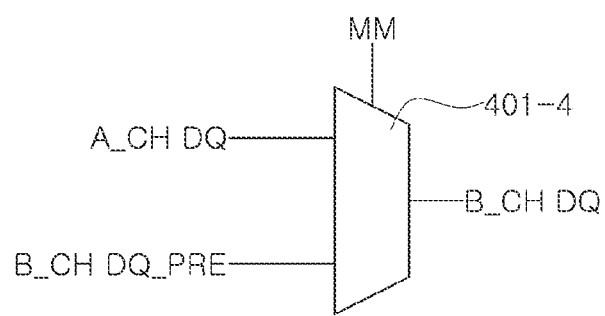

FIGS. 4A and 4B are diagrams exemplarily illustrating the mirroring mode circuit MMC according to an example embodiment of the present disclosure. Referring to FIG. 4A, the multiplexer 401-2 receives a first command signal A_CH CMD from the first channel A and a second preliminary command signal B_CH CMD_PRE from the second channel B and outputs a second command signal B_CH CMD in response to the mirroring mode signal MM. Referring to FIG. 4B, the multiplexer 401-4 receives a first data signal A_CH DQ from the first channel A and a second preliminary data signal B_CH DQ_PRE from the second channel B and outputs a second data signal B_CH DQ in response to the mirroring mode signal MM.

The memory device 400 according to an example embodiment of the present disclosure may connect commands/addresses/data (CMD/ADDR/DQ) of the first channel A to the second channel B using an internal multiplexer. Accordingly, in a stacked memory device 400, data to be written in the first channel A in the mirroring mode may be simultaneously written at the same address in the second channel B.

In an embodiment, when an error rate occurring in the first channel A exceeds a certain level (e.g., when ECC correction occurs more than 10 times in 24 hours), the data of the first channel A is mirrored (copied) to the second channel B. A built-in self-test (BIST) function for reading and writing a memory in a memory device may be provided. By applying the BIST function, designated data of the first channel A in the memory may be copied to the second channel B. A memory system according to an example embodiment of the present disclosure may employ the BIST function according to an IEEE 1500 standard, which is a Standard for Embedded Core Test.

Figure 5:
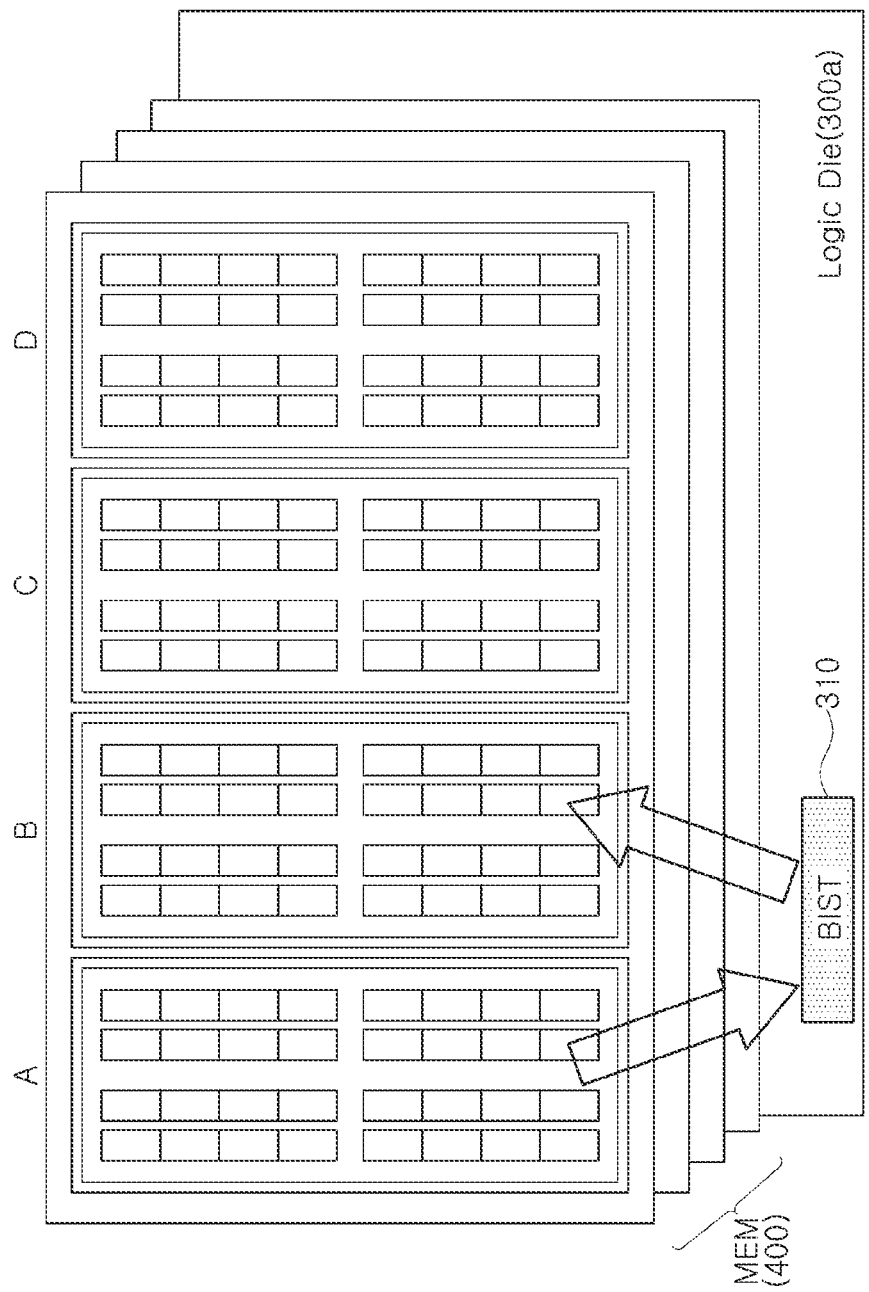
FIG. 5 is a conceptual diagram illustrating data transmission of a first channel A to a second channel B using a BIST in a memory system according to an example embodiment of the present disclosure.

FIG. 5 is a conceptual diagram illustrating data transmission of the first channel A to the second channel B using a BIST in a memory system according to an example embodiment of the present disclosure. As illustrated in FIG. 5, a logic die 300a may include a BIST circuit 310. The BIST circuit 310 may be configured to perform BIST function as described above. For example, the BIST circuit 310 may be configured to copy data of the first channel A to the channel B.

According to an embodiment of the present disclosure, the data mirroring operation may be provided within the memory device as a turnkey solution without involving the control chip (for example, CPU; refer to 500 in FIG. 1). That is, the memory device may perform mirroring operation independently of the control chip. Since the data mirroring operation is performed independently of the CPU, power consumption may be reduced, and thus, overall performance of the memory system may be improved.

The memory system according to an embodiment of the present disclosure, may write the same data to at least two channels or initiate the mirroring mode operation only when the error rate of the first channel (A) exceeds a threshold value. As a result, the mirroring operation in this embodiment provides a significant current-saving effect compared to conventional mirroring mode operations.

Figure 6:
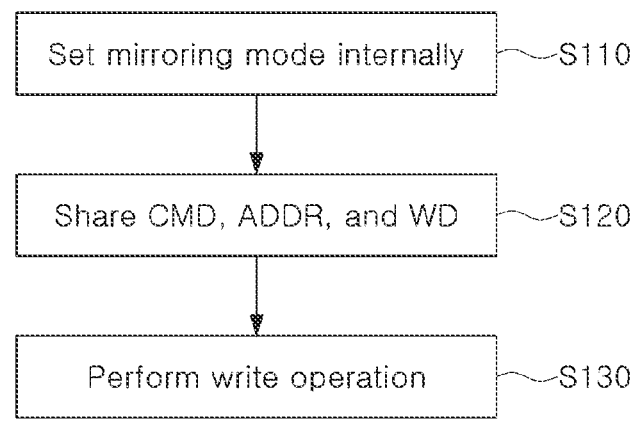
FIG. 6 is a flowchart illustrating an operating method of a memory device according to an example embodiment of the present disclosure.

FIG. 6 is a flowchart illustrating an operating method of a memory device according to an example embodiment of the present disclosure. Referring to FIGS. 1 to 6, an operation of the memory device may be performed as follows.

The memory device may internally determine whether to enter the mirroring mode according to a test operation or an internal policy and set the mirroring mode (S110). The memory device may share a command CMD, an address ADDR, and a write data WD from any one corresponding channel in the mirroring mode (S120). For example, the command CMD, an address ADDR, and a write data WD for a first channel may be shared with a second channel in the mirroring mode. The memory device may perform a write operation using the shared command CMD, the shared address ADDR, and the shared write data WD (S130). For example, the memory device may be written using the shared channels in the mirroring mode.

In an example embodiment, the mirroring mode is set by performing the test operation on the memory device and setting a mode register set (MRS) according to a result of the test operation. In an example embodiment, an error rate occurring in another channel may be determined by an error correction circuit, and when the error rate exceeds the threshold, the operation mode may be determined as the mirroring mode. In an example embodiment, when the error rate exceeds the threshold, data may be copied from another memory device connected to another channel in the mirroring mode. In an example embodiment, when the operation mode is the mirroring mode, the channel may be blocked from the memory device, and the other channels may be connected to the memory device to share the command CMD, the address ADDR, and the write data WD. For example, when data is to be written to a first channel during the mirroring mode, but the error rate of the first channel exceeds the threshold, access to the first channel may be blocked so that the data can be written to at least a second other channel.

Figure 7:
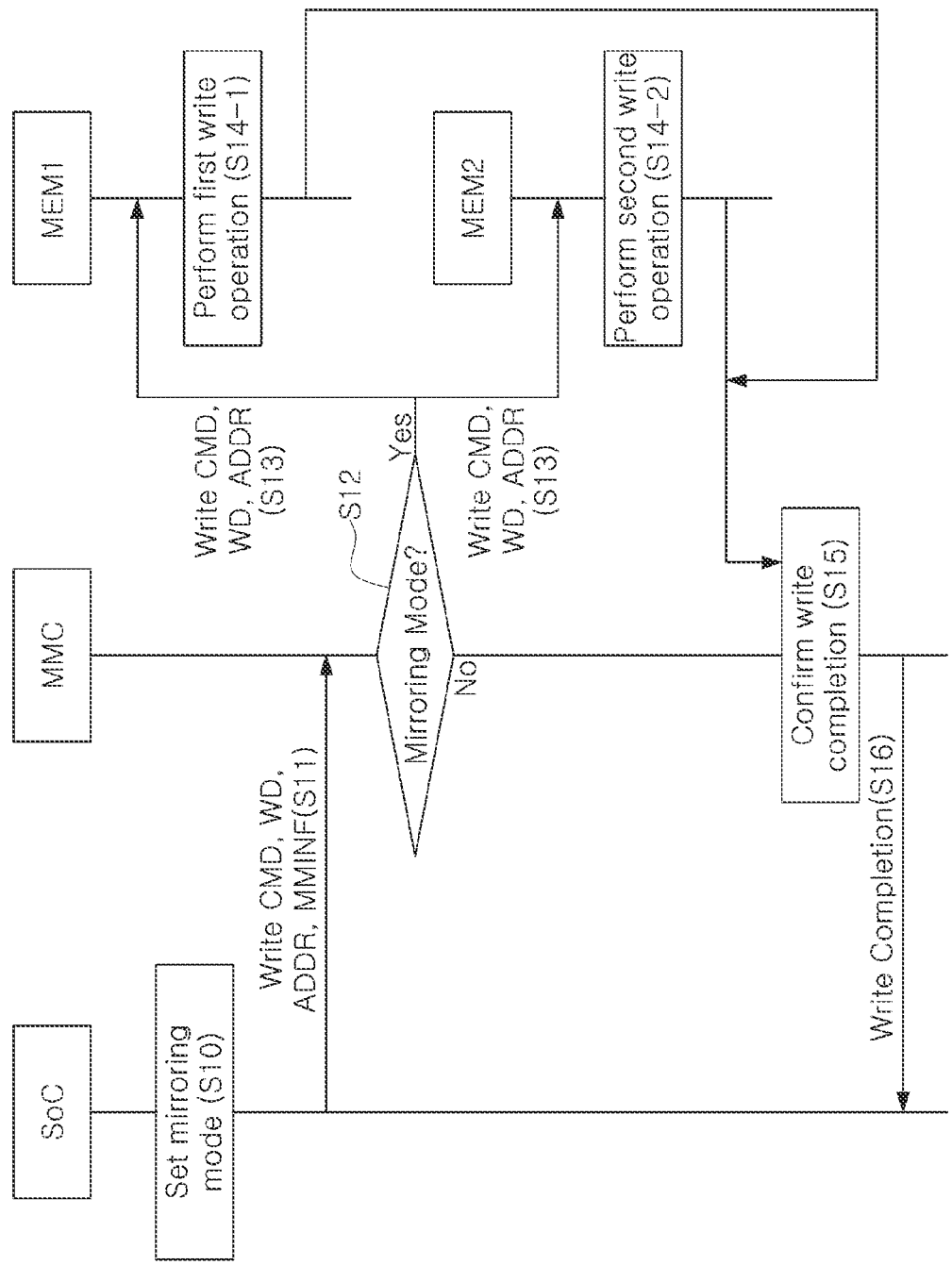
FIG. 7 is a flowchart illustrating a data mirroring operation of a memory system according to an example embodiment of the present disclosure.

FIG. 7 is a flowchart illustrating the data mirroring operation of the memory system according to an example embodiment of the present disclosure. Referring to FIGS. 1 to 7, the data mirroring operation of the memory system may be performed as follows.

A system-on-chip SoC sets a mirroring mode for memory devices MEM1 and MEM2 according to an internal policy or an external request (S10). When the mirroring mode is set, a mirroring mode circuit MMC may be activated. When the mirroring mode is not set, the mirroring mode circuit MMC may be deactivated.

During the write operation, the system-on-chip SoC transmits a write command, write data, an address, and mirroring mode information MMINF to the mirroring mode circuit MMC (S11). The mirroring mode circuit MMC determines whether the write operation is in the mirroring mode based on mirroring mode information MMMINF (S12). When the write operation is in the mirroring mode, the mirroring mode circuit MMC transmits the write command, the write data, and the address to the first memory device MEM1 and the second memory device MEM2 through a shared channel (S13). The first memory device MEM1 receives the write command, the write data, and the address and perform a first write operation (S14-1). For example, the write data is written to the first memory device MEM1. The second memory device MEM2 receives the write command, the write data, and the address and performs a second write operation (S14-2). For example, the write data is written to the second memory device MEM2. In an embodiment, operations S14-1 and S14-2 occur at the same time. Then, the mirroring mode circuit MMC confirms that writing of the write data has completed (S15). The mirroring mode circuit MMC may receive write completion information from the first and second memory devices MEM1 and MEM2 and determine completion of the write operation from the received write completion information. For example, first write completion information from the first memory device MEM1 may indicate whether the first memory device MEM1 has completed writing of the write data and second write completion information from the second memory device MEM2 may indicate whether the second memory device MEM2 has completed writing of the write data. Then, the mirroring mode circuit MMC may output the write completion information to the system-on-chip SoC (S16).

Figure 8:
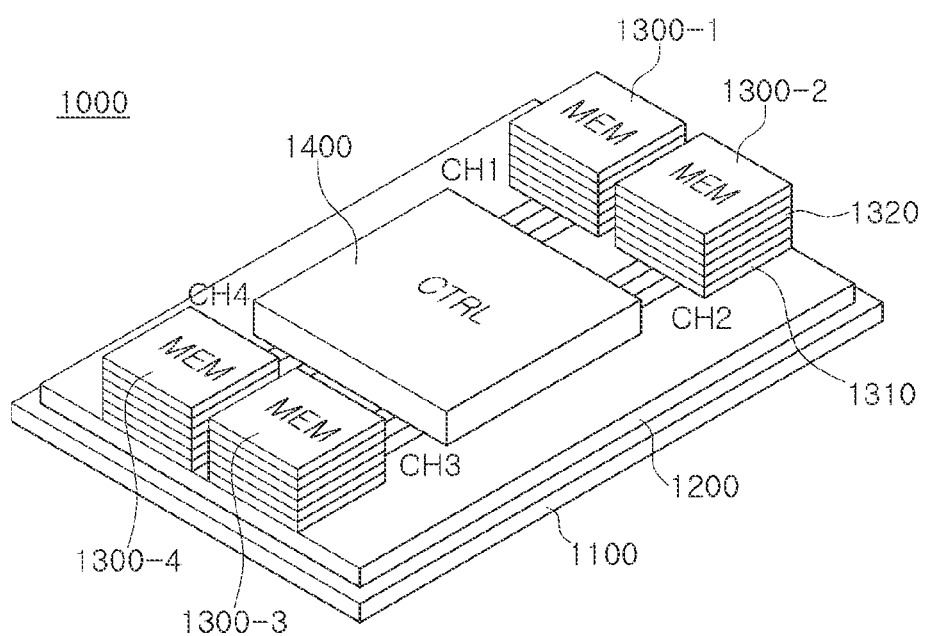
FIG. 8 is a diagram illustrating a memory system 1000 according to an example embodiment of the present disclosure.

FIG. 8 is a diagram illustrating a memory system 1000 according to an example embodiment of the present disclosure. Referring to FIG. 8, the memory system 1000 may include a plurality of memory modules 1300-1, 1300-2, 1300-3, and 1300-4 (e.g., memory devices), and a controller 1400 (CTRL) (e.g., a control circuit). In an example embodiment, an interposer 1200 may be selectively further provided on a package substrate 1100.

The memory system 1000 may be implemented to be included in a personal computer (PC) or a mobile electronic device. The mobile electronic device include a laptop computer, a mobile phone, a smartphone, a tablet PC, personal digital assistant (PDA), enterprise digital assistant (EDA), a digital still camera, a digital video camera, a portable multimedia player (PMP), a personal navigation device or a portable navigation device, a handheld game console, a mobile Internet device (MID), a wearable computer, an Internet of Things (IoT) device, an Internet of Everything (IoE) or a drone.

Each of the memory modules 1300-1, 1300-2, 1300-3 and 1300-4 may be implemented to be mounted on the package substrate 1100 such as a printed circuit board. Further, each of the memory modules 1300-1 to 1300-4 may be connected to the controller 1400 through channels CH1 to CH4, and may be implemented as a Chip on Chip (CoC), as illustrated in FIG. 1.

Further, each of the memory modules 1300-1 to 1300-4 may include a buffer chip 1310 and at least one memory chip 1320 (MEM). Here, the buffer chip 1310 and at least one memory chip 1320 may be connected to each other by a through silicon via (TSV).

The buffer chip 1310 may be implemented to perform a buffering function on data of the memory chip 1320. Furthermore, the buffer chip 1310 may be implemented to perform a training operation on the memory chip 1320.

The memory chip 1320 MEM may be implemented as a volatile memory device or a nonvolatile memory device. In an example embodiment, the volatile memory device may be implemented as a random access memory (RAM), a dynamic RAM (DRAM), a static RAM (SRAM), or a low power double data rate (LPDDR) DRAM. In an example embodiment, the nonvolatile memory device may be implemented as an electrically erasable programmable read-only memory (EPROM), a Noah flash memory, a NAND flash memory, a magnetic resistive random access memory (MRAM), spin transfer torque (STT)-MRAM, a ferroelectric RAM (FeRAM), a phase change RAM (PRAM), a resistive RAM (RRAM), a nanotube RRAM, a polymer RAM (PoRAM), a nano floating gate memory (NFGM), a holographic memory, a molecular electronics memory device, or an insulator resistance change memory.

In an example embodiment, each of the memory modules 1300-1, 1300-2, 1300-3 and 1300-4 may be a high bandwidth memory (HBM). While, four memory modules are illustrated, it should be understood that the number of memory modules 1300-1, 1300-2, 1300-3 and 1300-4 illustrated in FIG. 1 is not limited thereto.

The controller 1400 (CTRL) may be implemented to control memory modules 1300-1, 1300-2, 1300-3 and 1300-4 connected to each of the channels. In an example embodiment, the controller 1400 may be implemented as a system on chip (SoC), an application processor (AP), a mobile AP, a chipset, or a set of chips. The controller 1400 may include a random access memory (RAM), a central processing unit (CPU), a graphics processing unit (GPU), a neural processing unit (NPU), or a modem. In an example embodiment, the controller 1400 may perform a function of a modem and a function of the AP.

In addition, the controller 1400 may be implemented to control the memory chip 1320 to read data stored in the memory chip 1310 or to write data to the memory chip 1320. The controller 1400 may control a write operation or a read operation for the memory chip 1320 by providing a command and an address to the memory chip 1320 in synchronization with a clock signal. Further, data may be transmitted and received between the controller 1400 and the memory chip 1320 in synchronization with a data transmission clock.

In addition, the controller 1400 may control the memory modules 1300-1, 1300-2, 1300-3 and 1300-4 to provide a data mirroring function. That is, at least two of the memory modules 1300-1, 1300-2, 1300-3 and 1300-4 may be implemented to store the same data during the write operation. For example, the controller 1400 may control the memory modules 1300-1 and 1300-2 to simultaneously write the same data in the memory module 1300-1 connected to the first channel CH1 and the memory module 1300-2 connected to the second channel CH2 in response to one write command.

Furthermore, the controller 1400 may support a mirroring mode providing the data mirroring function during the write operation and a normal mode providing a normal operation. For example, no data mirroring function is performed during the normal operation.

The memory system 1000 according to an example embodiment of the present disclosure may write the same data in a plurality of memory channels CH1 to CH4 in the mirroring mode, and when data of some channels becomes damaged, the integrity of the data may be maintained by using the data of the undamaged channel.

The present invention discloses embodiments of a memory system that implements data mirroring functionality in a memory device. The memory system of the present invention, may reduce buffer current when using the internal mirroring function. Further, when a channel defect is detected, the memory system can quickly enhance RAS without the need for rebooting by utilizing other channels. The memory device according to an embodiment of the present invention provides a first mode (e.g., a mirroring mode) that simultaneously writes data to the same address of other channels when performing a write operation on one channel, when two or more channels are available, each having their respective cells.

In an embodiment, multiple channels may each be equipped with a buffer to receive command inputs from the outside. In the first mode, according to the embodiment, the buffer of one channel is used, while the buffers of other channels are not used. In an embodiment, multiple channels may each be equipped with a buffer to receive data inputs from the outside. In the first mode, according to the embodiment, the buffer of one channel is used, while the buffers of other channels are not used. In an embodiment, the first mode may be entered on the fly by applying an MRS setting or command.

The present disclosure may be applicable to various memory modules. For example, the memory module may be implemented as a single in-line memory module (SIMM), a dual in-line memory module (DIMM), a small-outline DIMM (SODIMM), an unbuffered DIMM (UDIMM), a fully-buffered DIMM (FBDIMM), a rank-buffered DIMM (RBDIMM), a mini-DIMM, a micro-DIMM, a registered DIMM (RDIMM) or a load-reduced DIMM (RDIMM).

While example embodiments have been illustrated and described above, it will be apparent to those skilled in the art that modifications and variations could be made without departing from the scope of the present inventive concept as defined by the appended claims.

What is claimed is:

1. A memory system comprising:
a package substrate;
an interposer disposed on the package substrate;
a logic die disposed on the interposer;
a memory device disposed on the logic die; and
a control chip configured to control the memory device,
wherein the memory device includes a plurality of stacked memory dies,
each of the plurality of memory dies includes a first memory device connected to a first channel and a second memory device connected to a second channel, and
in a mirroring mode, the first memory device is configured to perform a first write operation on write data, and the second memory device is configured to perform a second write operation on the write data identical to the write data in the first write operation, and the write data in the second write operation is written in the first channel at the same address the write data in the first write operation is written in the second channel.

2. The memory system of claim 1, wherein each of the plurality of memory dies includes a mirroring mode circuit configured to operate in the mirroring mode.

3. The memory system of claim 1, wherein each of the first memory device and the second memory device includes a row address buffer, a column address buffer, and a data buffer, and
in the mirroring mode, the second memory device is configured to use row address buffer, the column address buffer, and the data buffer of the first memory device in the second write operation.

4. The memory system of claim 3, further comprising:
a first multiplexer configured to output one of an output signal of the row address buffer of the first memory device and an output signal of the row address buffer of the second memory device in response to a mirroring mode signal;
a second multiplexer configured to output one of an output signal of a command decoder of the first memory device and an output signal of a command decoder of the second memory device in response to the mirroring mode signal;
a third multiplexer configured to output one of an output signal of the column address buffer of the first memory device and an output signal of the column address buffer of the second memory device in response to the mirroring mode signal; and
a fourth multiplexer configured to output one of an output signal of the data buffer of the first memory device and an output signal of the data buffer of the second memory device in response to the mirroring mode signal.

5. The memory system of claim 1, wherein the mirroring mode is determined according to a result of a test operation performed on the memory device.

6. The memory system of claim 1, wherein the mirroring mode is activated based on an error rate for the first channel exceeding a threshold.

7. The memory system of claim 1, wherein the logic die includes a built-in self-test (BIST) circuit for reading or writing data in the first memory device and the second memory device, and
wherein the BIST circuit is configured to copy data of the first memory device to the second memory device.

8. The memory system of claim 1, wherein the mirroring mode is entered by setting a mode register set (MRS) or applying a command.

9. The memory system of claim 1, wherein the mirroring mode is set by the control chip.

10. The memory system of claim 1, wherein the first write operation and the second write operation are simultaneously performed by a single write command.

11. An operating method of a memory device connected to a control chip through a plurality of channels, the operating method comprising:
setting, by the memory device, an operation mode of the memory device internally to a mirroring mode;
sharing a command, an address, and write data of a first channel among the plurality of channels with a second channel among the plurality of channels, in the mirroring mode; and
performing, by the memory device, a write operation using the command, the address, and the write data shared with the second channel,
wherein in the mirroring mode, the write data shared with the second channel is identical to the write data of the first channel, and the write data written in the second channel is written at the same address of the write data shared with in the first channel.

12. The operating method of claim 11, wherein the setting the mirroring mode comprises:
performing a test operation on the memory device; and
setting the mirroring mode by setting a mode register set (MRS) according to a result of the test operation.

13. The operating method of claim 11, wherein the setting the mirroring mode comprises:
determining an error rate generated in the first channel by an error correction circuit; and
setting the operation mode as the mirroring mode when the error rate exceeds a threshold.

14. The operating method of claim 13, further comprising:
copying data from another memory device connected to the second channel in the mirroring mode when the error rate exceeds the threshold.

15. The operating method of claim 11, wherein the sharing comprises:
blocking the first channel from the memory device when the operation mode is the mirroring mode; and
connecting the second channel to the memory device to share the command, the address, and the write data.

16. A memory device having a plurality of memory dies stacked on a package substrate,
wherein each of the plurality of memory dies comprises:
a first memory device including a first row address buffer, a first column address buffer, and a first data buffer, connected to a first channel; and
a second memory device including a second row address buffer, a second column address buffer, and a second data buffer, connected to a second channel,
wherein the second memory device comprises:
a first multiplexer configured to output one of an output signal of the first row address buffer and an output signal of the second row address buffer in response to a mirroring mode signal;
a second multiplexer configured to output one of an output signal of a first command decoder and an output signal of a second command decoder in response to the mirroring mode signal;
a third multiplexer configured to output one of an output signal of the column address buffer and an output signal of a column address buffer of the second memory device in response to the mirroring mode signal; and
a fourth multiplexer configured to output one of an output signal of the first data buffer and an output signal of the second data buffer in response to the mirroring mode signal.

17. The memory device of claim 16, wherein the mirroring mode signal is output from mode register set (MRS) information.

18. The memory device of claim 16, wherein the first channel and the second channel are connected to an external control chip through a through silicon via (TSV).

19. The memory device of claim 16, wherein the mirroring mode signal is generated internally within the memory device when an error rate of the first channel exceeds a threshold.

20. The memory device of claim 16, wherein each of the plurality of memory dies further includes a mirroring mode circuit configured to operate in a mirroring mode based on the mirroring mode signal.

* * * * *